United States Patent [19]
Reeves et al.

[11] 3,990,302
[45] Nov. 9, 1976

[54] AUTOMOTIVE IGNITION ANALYZER WITH CYLINDER OF INTEREST DISPLAY

[75] Inventors: George I. Reeves, Fullerton; Hoke R. Chism, Jr., Anaheim, both of Calif.

[73] Assignee: Beckman Instruments, Inc., Fullerton, Calif.

[22] Filed: Nov. 26, 1975

[21] Appl. No.: 635,738

[52] U.S. Cl. .................... 73/116; 324/16 S
[51] Int. Cl.² .................... G01M 15/00
[58] Field of Search ............ 73/116, 118, 117.3; 324/16 S, 16 T

[56] References Cited
UNITED STATES PATENTS

| | | | |
|---|---|---|---|
| 3,548,300 | 12/1970 | Nolting | 73/118 X |
| 3,650,149 | 3/1972 | Howes | 73/117.3 |
| 3,798,965 | 3/1974 | Pelta et al. | 73/117.3 |

*Primary Examiner*—Jerry W. Myracle
*Attorney, Agent, or Firm*—R. J. Steinmeyer; P. R. Harder

[57] ABSTRACT

An automotive ignition analyzer is disclosed with cylinder of interest of display capabilities which allows one or more cylinders to be individually selected and displayed in a stacked mode while the remaining unselected cylinders are simultaneously displayed on the same oscilloscope in a parade mode. The cylinder select mechanism may also be used for power balance purposes to prevent the ignition of the cylinder selected.

17 Claims, 4 Drawing Figures

AUTOMOTIVE IGNITION ANALYZER WITH CYLINDER OF INTEREST DISPLAY

BACKGROUND OF THE INVENTION

1. Field of the Invention

The instant invention relates to ignition analyzers which display signal information related to the operation of the ignition systems of multi-cylinder internal combustion engines, such as automobile engines, on an oscilloscope for use by a mechanic in analyzing engine performance.

2. Description of the Prior Art

Ignition analyzers utilizing oscilloscope displays are well known in the art and well accepted by both the professional and amateur mechanic as instruments for providing detailed information regarding the performance of a particular internal combustion engine, usually an automobile. The most basic display format utilizes electrical signals related to the voltage impressed across each spark plug of the internal combustion engine and displays these signals throughout one engine cycle, that is, through one cycle of firing of each spark plug. This is called the parade mode of display. Typically a magnetic or capacitive probe is connected to the secondary circuit of the ignition system at the high tension wire leading between the coil and distributor. The signal developed thereby is then suitably amplified and provided to the vertical input of an oscilloscope to drive the oscilloscopic trace vertially. The horizontal input of the oscilloscope is provided by a ramp generator which is synchronized with the engine cycle, that is, the ramp moves the oscilloscopic trace across the face of the display once per engine cycle. This is normally accomplished by synchronizing the beginning or end of the ramp to the firing of a particular cylinder, conveniently called cylinder No. 1. The major drawback to the parade mode of display is that the horizontal width of the oscilloscopes is in practice insufficient to show all the cylinders of a multi-cylinder engine in sufficient detail to provide all the required information.

In the stacked mode format of display, which was developed to overcome this drawback of the parade mode, the ramp moves the trace through its horizontal range of motion once per cylinder ignition. This is usually accomplished by synchronizing the beginning of the ramp to the spike of energy at the beginning of a cylinder's ignition time.

In order to avoid superimposing the traces related to each cylinder upon each other, the stacked mode provides a vertical separation between the traces related to the different cylinders. That is, cylinder No. 1 would be displayed across the bottom of the scope face and cylinder No. 2 and on displayed vertically above the lower traces.

The major drawback to the stacked mode of operation is in that the vertical dimension of the traces is limited by the number of cylinders required to be displayed at the same time. Although the horizontal information may be displayed more clearly than in parade, the vertical information is severely limited.

One solution to this problem is to provide two oscilloscopes, the first arranged to display the parade mode and the second to display a single cylinder firing in a manner similar to the stacked mode of operation. This is, of course, expensive and inconvenient.

Ignition analyzers also generally provide a power balance function by which the mechanic is provided with a mechanism for preventing ignition within a particular cylinder while monitoring engine performance changes. This is not necessarily associated with an oscilloscope display but may be provided in the same instrument. The power balance mode of operation requires that the individual cylinders be separately identifiable and this is conventionally accomplished by means of a counter. The counter is typically arranged to change value or count every time any spark plug fires and is then reset when the spark plug associated with cylinder No. 1 fires. A selector switch and comparator function is normally provided allowing the counter value associated with a particular cylinder to activate the ignition prevention device so as to disable the ignition system only at the proper time. Such ignition prevention devices are typically electronic shorting switches connected across the distributor points so that the points are rendered effectively inoperable where the switch is activated.

SUMMARY OF THE INVENTION

The instant invention provides method and apparatus for displaying electrical signals representing the operation of a particular cylinder or cylinders, as selected by the mechanic, in a stacked mode while the remainder of the cylinders, i.e. those unselected, are displayed in the parade mode. This arrangement allows the mechanic to study the ignition signal from one cylinder in detail while, at the same time, viewing all cylinders together. The individual cylinder firings are counted and a cylinder of interest pulse is generated during the firing of the selected cylinder. This cylinder of interest pulse is used to cause the display to change from the parade mode to the stacked mode only during the time of ignition of the cylinder of interest selected.

It is important to assure that the cylinder of interest pulse is provided at the very beginning of the ignition of the cylinder selected. This is accomplished by using a cylinder counter to provide a pulse to set a clocked flip-flop during the firing of the cylinder which fires before the cylinder of interest. The signal representing ignition of the selected cylinder is then applied to the flip-flop as a clock pulse so that the beginning of the cylinder of interest pulse coincides with the leading edge of the signal representing the cylinder of interest selected.

Activation of a power balance switch causes the cylinder of interest pulse to actuate an ignition prevention switch for power balance test purposes. This arrangement allows the cylinder of interest selection mechanism to also serve as the power balance cylinder selection mechanism. An offset signal is generated when no cylinder is selected. The power balance switch applies this signal level to the ignition prevention switch continuously so that operation of the engine ceases. In this manner the power balance switch acts as a kill button.

Additionally, a vertical offset is provided whenever any cylinder of interest is selected so that in the stacked mode of display the lowest trace would not be superimposed upon the parade mode display.

DETAILED DESCRIPTION OF A PREFERRED EMBODIMENT OF THE INVENTION

Figure 1:
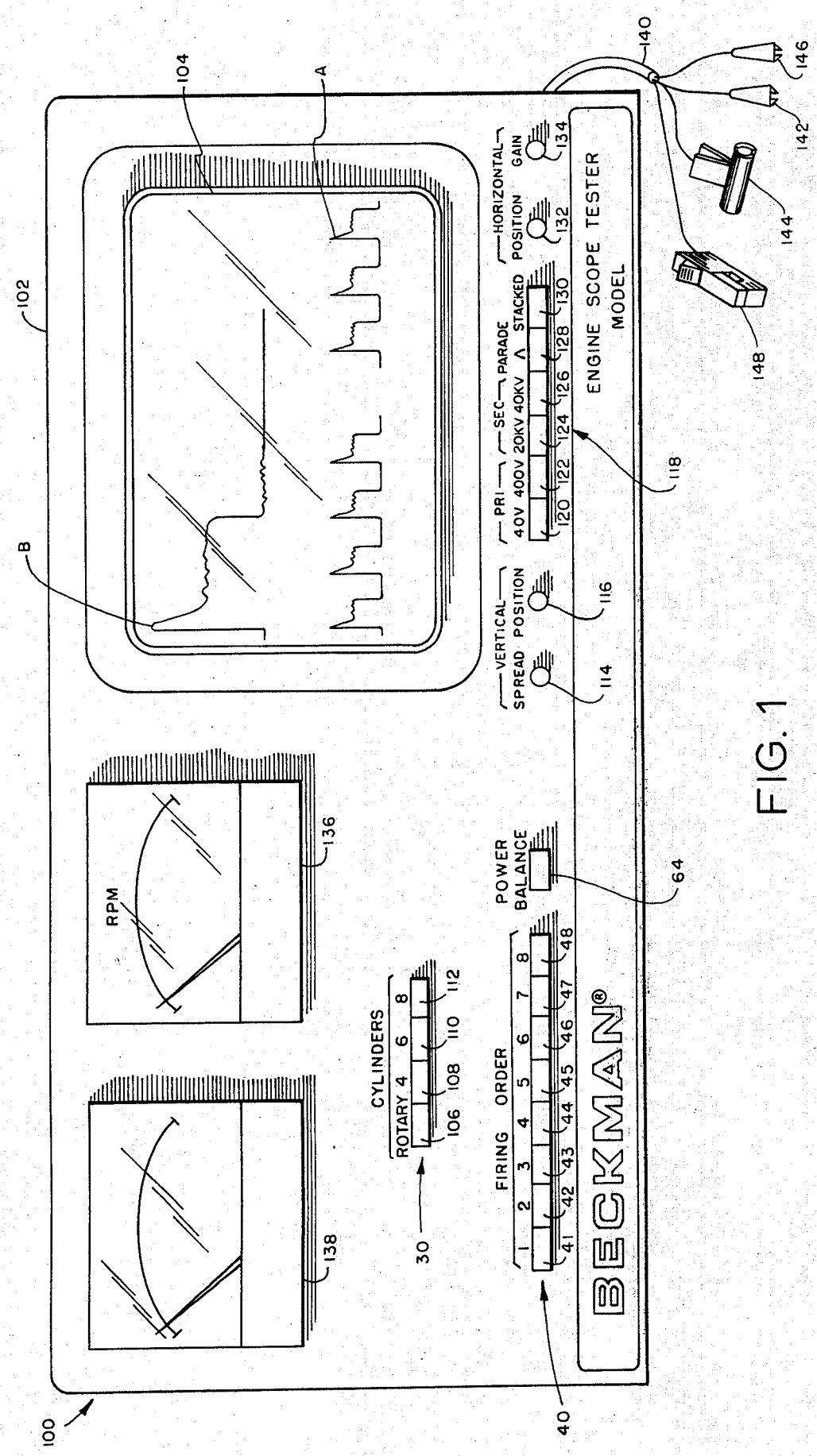
FIG. 1 shows an automotive ignition analyzer with cylinder of interest display according to the instant invention.

FIG. 1 shows automotive engine analyzer 100 according to the instant invention. On panel 102 is mounted cathode ray oscilloscopic display 104 upon which the traces described below herein are displayed. "Number of cylinders" select switch 30 includes pushbutton 106 for rotary engines, pushbutton 108 for four cylinder engines, pushbutton 110 for six cylinder engines, and pushbutton 112 for eight cylinder engines. The purpose of this switch will be described below in greater detail with respect to FIG. 2. Analyzer 100 also includes "cylinder of interest" select switch 40 having pushbuttons 41 through 48 representing the selection of cylinders 1 through 8 respectively. Also included on panel 102 is power balance pushbutton 64, vertical spread adjustment 114 and vertical position adjustment 116. Display mode select switch 118 includes pushbuttons 120 and 122 for primary display of 40 volts and 400 volts, respectively, and pushbuttons 124 and 126 for secondary display of 20,000 and 40,000 volts, respectively. Additionally, pushbutton 128 selects the parade mode of display and pushbutton 130 selects the stacked mode display. Horizontal adjustments are provided by horizontal position adjustment 132 and gain adjustment 134. Also included on panel 102 is indicator 136 which may conveniently be a tachometer and indicator 138 which may be a voltmeter.

Analyzer 100 is operated from a conventional source of power and is connected to the internal combustion engine to be analyzed by cable 140 which includes primary clip lead 142, secondary capacitive coupler 144, cylinder No. 1 probe 148 and ground lead 146.

After connecting clip 142 to the primary side of the ignition coil, capacitive coupler 144 to the secondary circuit of the ignition coil, cylinder No. 1 probe 148 to the high tension lead for cylinder No. 1 and clip lead 146 to the engine ground, analyzer 100 may be operated as follows. The proper pushbutton within switch 30 must be actuated for the number of cylinders of the engine to be tested. Switch 118 must be actuated to choose between parade or stacked modes of display and between primary or secondary signal pickups, together with the voltage range therefor. If stacked pushbutton 130 is actuated, oscilloscope 104 will display the number of traces represented by the pushbutton of switch 30 actuated. That is, for an eight cylinder engine, eight separate traces will be displayed, one for each cylinder. The vertical distance between each trace may be modified by adjustment of spread adjust 114 and the traces may be rolled or moved in a vertical direction by adjustment of vertical position adjust 116. Horizontal position adjust 132 serves to move the traces in the horizontal direction for convenience or to line up the traces with convenient scale markings. Gain adjustment 134 may be utilized to expand the horizontal scale in order to investigate in more detail a portion of the traces.

If parade pushbutton 128 is actuated, a single trace will appear across the screen displaying, in sequence, signals representing the firing of all of the cylinders in the engine.

When in the parade mode of display, actuation of one of the pushbuttons in cylinder of interest select switch 40 causes the display representing the appropriately numbered cylinder to be removed from the parade display and positioned in the stacked mode. For example, if pushbutton 45 is actuated while parade pushbutton 128 is actuated, the parade display as shown in trace A will include cylinders 1 through 8 of an eight cylinder engine except cylinder 5 which will be positioned vertically thereabove as shown in trace B in an expanded horizontal scale. Further, if power balance switch 64 is depressed, cylinder No. 5 will not be allowed to fire. It is possible by first actuating and then releasing pushbutton 64 to determine the difference in engine speed as indicated on tachometer 136 resulting from the operation of cylinder 5. This is the power balance test and can be used as an indication of the relative effectiveness and/or power contribution of each cylinder.

If, however, power balance switch 64 is actuated without the actuation of any of the pushbuttons in switch 40, ignition in all cylinders will be prevented and the internal combustion engine will cease operation.

Operation of the horizontal circuitry for analyzer 100 will be next described with reference to FIG. 2 subsequent to which the vertical circuitry will be described with respect to FIG. 3. The graphs of FIG. 4 will then be utilized to describe and explain the time relationship between the various signals of importance in the circuitry shown in FIGS. 2 and 3.

Figure 2:
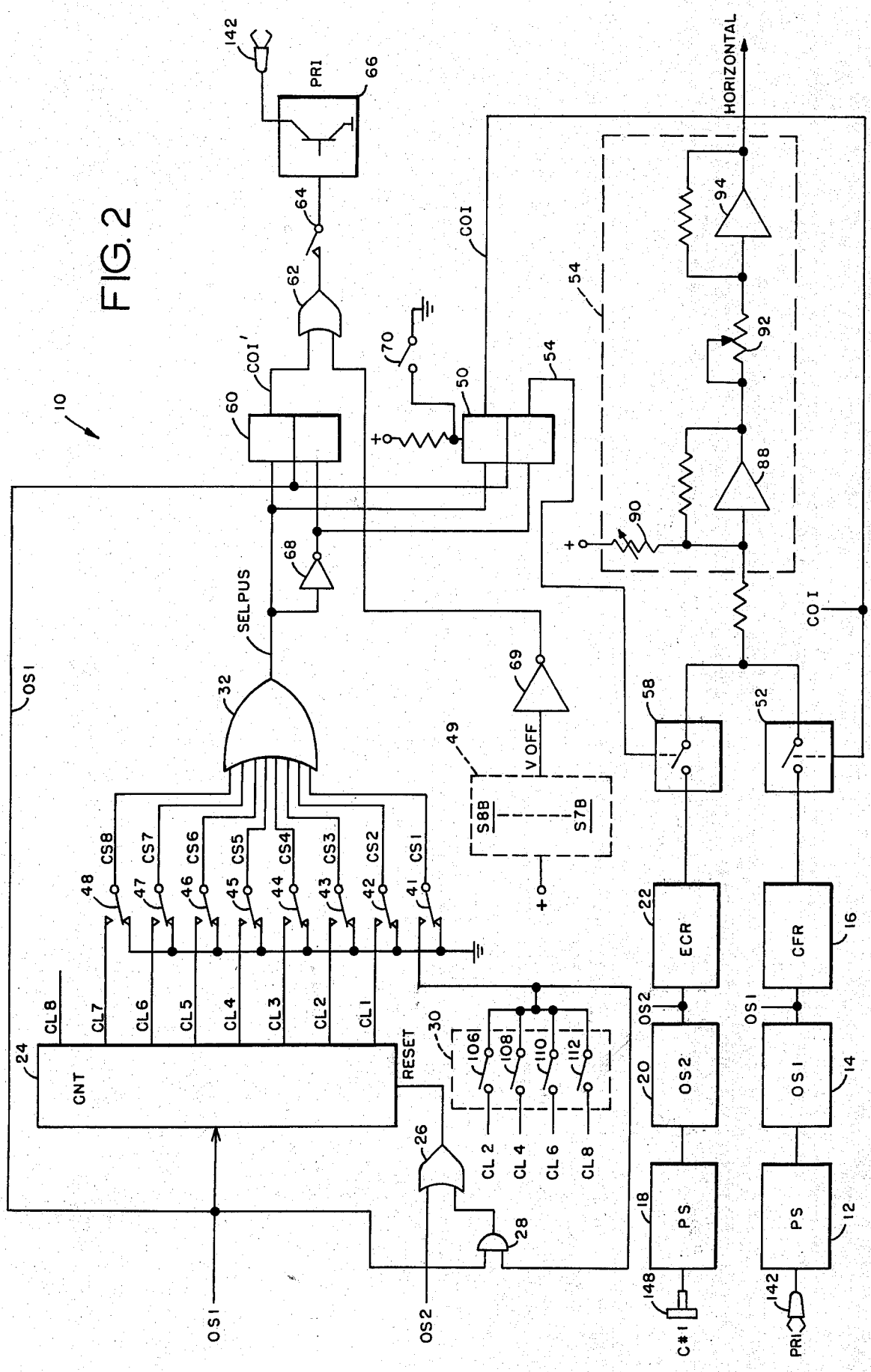
FIG. 2 shows in schematic form the horizontal circuitry of the analyzer of FIG. 1.

FIG. 2 shows in schematic form horizontal circuitry 10 of analyzer 100 which develops the horizontal input for oscilloscopic display 104 according to the instant invention. Pulse shaping network 12, which may be any suitable filtering or shaping circuit, is tied to the primary of the ignition system, i.e. the ungrounded side of the points, by probe 142. The signal provided by pulse shaping circuit 12 is used to trigger one shot 14 which provides the signal OS1. This pulse occurs coincident with the leading edge or some other predetermined part of the firing of every cylinder. OS1 is utilized to trigger ramp generator 16 the output of which is designated herein as the cylinder firing ramp, CFR. This ramp drives the horizontal input circuitry 54 of oscilloscope 104 when switch 52 is closed so as to move the trace through its horizontal range of motion during the time between successive OS1 pulses.

Pulse shaping network 18 is connected to cylinder No. 1 by probe 148. This may be the same cylinder No. 1 as designated by the manufacturer of the engine for convenience but need not be so. Pulse shaping circuit 18 provides the same function as circuit 12 and serves to trigger one shot 20 which provides the pulse OS2. This pulse occurs once per engine cycle, that is, coincident with the leading edge or some other part of the firing of cylinder No. 1. OS2 is utilized to trigger ramp generator 22 the output of which is designated herein as the engine cycle ramp, ECR. This ramp is applied to the horizontal input circuitry 54 of oscilloscope 104 when switch 58 is closed in order to move the trace through its horizontal range of motion once per engine cycle, that is, for every cycle of firing of all cylinders in the engine.

Counter 24 is provided with OS1 at its count input and generates the signals CL1–CL8. CL1 is the output time of counter 24 representing the initiation of firing of cylinder No. 1, etc. Counter 24 is reset by OS2 which is connected through OR gate 26 to the reset input of counter 24. The other input to OR gate 26 is the output of AND gate 28 which combines OS1 with the clear set signal CLRSET.

CLRSET is generated by number of cylinders switch 30 which is utilized to program analyzer 100 for the number of cylinders in the particular internal combustion engine to be tested. Pushbuttons 106, 108, 110 and 112 within pushbutton 30 select signals CL2, CL4, CL6 and CL8 respectively as CLRSET for 2, 4, 6 and 8 cylinder engines. Rotary engines are equivalent to 2 cylinder engines for this purpose. CLRSET, when synchronized by OS1 in AND gate 28, resets counter 24 through OR gate 26 so that counter 24 may also be reset by OS2 which represents the firing of cylinder No. 1.

OR gate 32 is utilized to generate the signal SELPULS. In a simpler version of an analyzer of this type the signal CL4 could be utilized, for example, as the cylinder of interest pulse, COI, for selecting cylinder 4. In order, however, to assure that the leading edge of COI is coincident with the leading edge of the firing of the particular cylinder of interest, it is necessary to avoid the delays inherent in the electronic components utilized. For this reason SELPULS is generated by the output of counter 24 corresponding to the cylinder firing just before the firing of the cylinder of interest selected.

For an 8 cylinder car it is necessary to provide eight cylinder of interest select pushbuttons. Each pushbutton has two positions, the OFF position in this embodiment representing a ground connection. When a particular cylinder of interest is selected, the actuated pushbutton connects the appropriate output of counter 24 to the appropriate input of OR gate 32. In order to provide the coincidences described above, pushbutton 48, corresponding to cylinder No. 8, is connected between CL7 and OR gate 32. Similarly, pushbutton 47 representing cylinder No. 7 is connected between CL6 and OR gate 32, etc. Pushbutton 41, representing cylinder No. 1, is connected between the output of switch 30, which is CLRSET, and OR gate 32. In this manner it can be seen that SELPULS is generated by the firing of the cylinder immediately preceding the selected cylinder of interest.

SELPULS is provided at the clocked SET input of clocked flip-flop 50, the set output of which is the cylinder of interest pulse COI. The clock input to flip-flop 50 is provided by OS1. In this manner, flip-flop 50 is set by SELPULS so that COI is generated at the same instant as OS1 for the selected cylinder.

COI is utilized in both the horizontal and vertical circuitry. In the vertical circuitry, COI operates switch 78 in a manner described below with reference to FIG. 3. In the horizontal circuitry, COI is utilized to activate switch 52 which applies CFR generator 16 to the input of horizontal amplifying circuitry 54. Horizontal amplifying circuitry 54 includes preamp 88 in the feedback path of which is variable resistance 90 which serves as horizontal position adjustment 132 shown in FIG. 1. The input for preamp 88 is provided by the outputs of switches 52 and 58 as discussed above. The output of preamp 88 is connected through variable resistance 92, which serves as gain adjustment 134, to horizontal amplifier 94 the output of which provides the horizontal input for oscilloscope 104.

SELPULS is also inverted by inverter 68 and connected to the clocked RESET input of flip-flop 50, the RESET output of which is utilized to operate switch 58.

In this manner it can be seen that in parade with none of the pushbuttons 41–48 activated, the horizontal input to the oscilloscopic display is provided by ECR generator 22. If a cylinder of interest is selected the horizontal input to oscilloscope 104, during the firing time of that cylinder of interest, the input to horizontal amplifying circuitry 54 is provided by CFR generator 16. During the remainder of the engine cycle, the horizontal input to the oscilloscope display is provided by ECR generator 22.

In addition, it is convenient to provide a power balance function which may be selected in the same manner as the cylinders of interest are selected. For this purpose SELPULS is connected to the clocked SET input of clock flip-flop 60, the clock input of which is also provided by OS1. SELPULS, after inversion by inverter 68, is connected to the clocked RESET input of flip-flop 60. The SET output of flip-flop 60 is COI' and is connected through OR gate 62 to power balance switch 64. If power balance switch 64 is activated, then COI' is provided to the power balance ignition prevention circuit, generally shown as shorting circuit 66. This may conveniently be a high power transistor switch connected across the points of the ignition to prevent firing of a cylinder when activated. As can be seen from the above description, when power balance switch 64 is activated any cylinder of interest selected will be prevented from firing.

It is convenient to provide pushbuttons 41–48 with a second gang of switches 49 all of which are arranged so that if any one of the above-mentioned pushbuttons is activated, the signal V-OFF is generated from a d.c. source not shown. V-OFF is inverted by inverter 69 and connected to the input of OR gate 62. In this manner it can be seen that if power balance switch 64 is activated and none of the cylinder of interest select pushbuttons 41–48 are activated, shorting circuit 66 will continuously prevent the firing of any cylinder. Thus, power balance switch 64 doubles as a so-called "kill button" to turn the engine off.

Switch 70 serves as pushbuttons 128 and 130 shown in FIG. 1 to select between the parade and stacked modes. Switch 70 is provided as a direct set for flip-flop 50. Activation of switch 70 sets flip-flop 50 which activates switch 52 to connect CFR ramp generator 16 to the horizontal input of oscilloscope 104. Therefore, when switch 70 is activated, flip-flop 50 is locked in the set mode, COI is continuously present and analyzer 100 is in the stacked mode of operation as will be explained in greater detail below. When switch 70 is not activated, analyzer 100 is in the parade mode since switch 58 is activated by the reset side of flip-flop 50.

Figure 3:
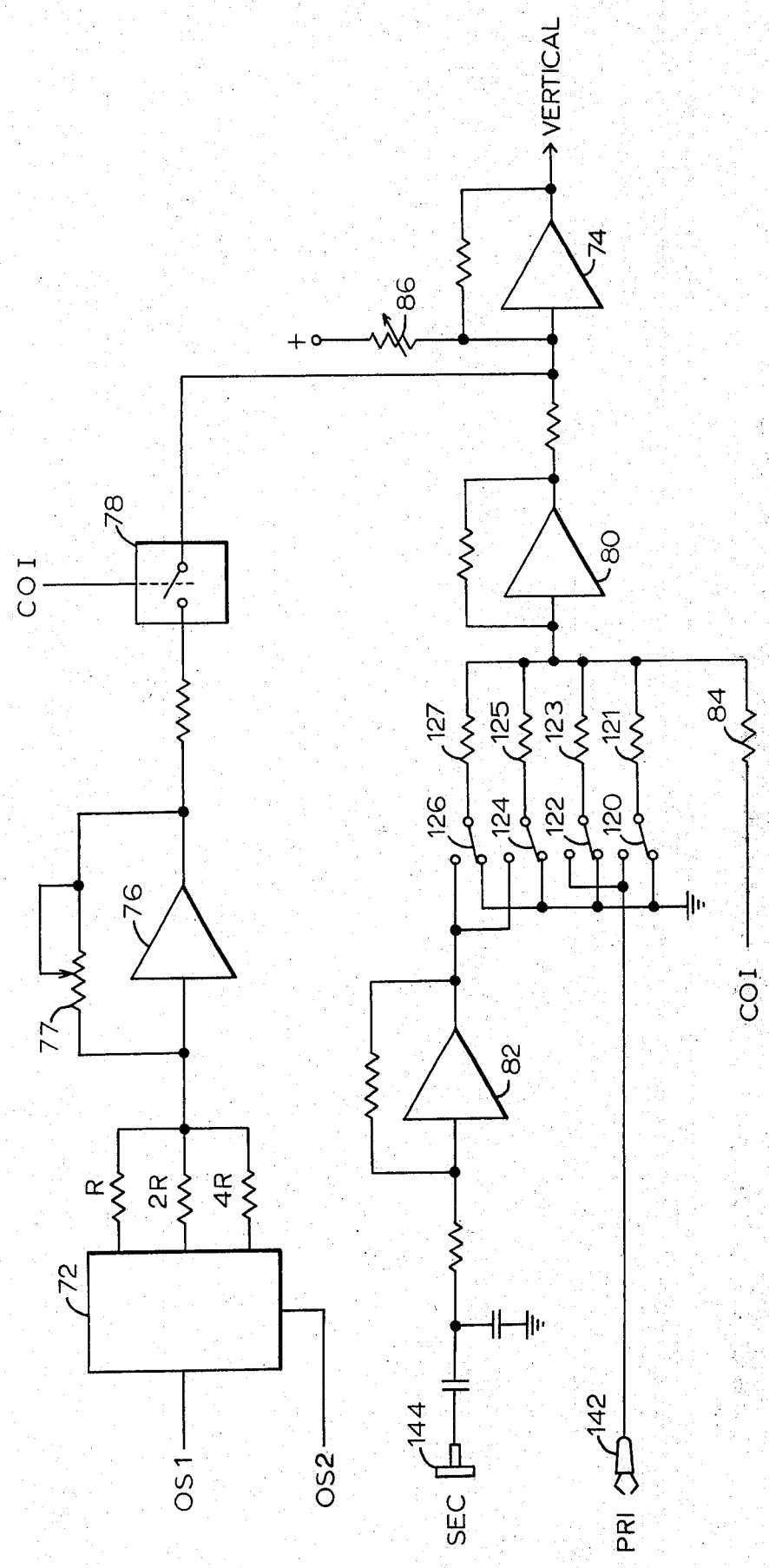
FIG. 3 shows the vertical circuitry of the analyzer of FIG. 1.

With reference now to FIG. 3, the stacked mode of operation of oscilloscope 104 will be explained. As explained above, with switch 70 activated, flip-flop 50 is locked in the set mode and COI is continuously present. This signal is applied through resistor 84 to the common input of amplifier 80 which provides an initial vertical offset signal through amplifier 74 which serves as the vertical input amplifier to oscilloscope 104. OS1 is provided at the count input of counter 72, while OS2 is provided to the RESET input thereto. Counter 72 may conveniently be a three-bit counter so that resistors of value R, 2R and 3R may be provided at the output of the counter. In this manner a value is generated for each count in the manner of a staircase generator. Counter 72 and resistors R, 2R and 4R provide both a counting and digital-to-analog converting function so that a first analog value is provided during the firing of cylinder No. 1 and a second analog value, twice the first, is provided during the firing of cylinder No. 2 and so on. These analog values are provided to vertical input amplifier 74 through spread amplifier 76 and switch 78. Variable resistance 77 in the feedback loop of amplifier 76 serves as vertical spread adjustment 114. When switch 78 is activated by COI (which in the stacked mode is continuously present), a vertical offset is provided for each cylinder firing so that in the stacked mode the traces representing the various cylinders are separated vertically for ease of interpretation. The vertical separation therebetween is controlled by adjustment 114.

In addition to the vertical displacement signal provided at the output of switch 78, amplifier 74 must be provided with signal information related to the signals developed at the probes connected to the automotive ignition system. As shown in FIG. 1, panel 102 contains switches 120, 122, 124 and 126 which allow the mechanic to choose two ranges in either primary or secondary display. The primary display signal developed by probe 142 is connected by switch 120 or 122 to resistors 121 and 123, respectively, which are connected at the input of primary amplifier 80. The signal developed by secondary capacitive coupler 144 is applied to the input of secondary amplifier 82 and connected to the input of amplifier 80 by either pushbutton 124 or 126 through resistors 125 or 127, respectively. The resistor values controls the range or gain of the amplifying stages in a conventional manner.

If the analyzer is in the parade mode and one of the cylinder of interest buttons 41–48 is depressed, say cylinder No. 5, the vertical position of the sweep is controlled by variable resistor 86 in the feedback loop of vertical amplifier 74. Variable resistor 86 provides the vertical adjustment 116 mentioned in connection with FIG. 1. When COI occurs during the firing of the selected cylinder, an additional vertical displacement signal is provided through the addition of COI at the input of amplifier 80 and the addition of the output of amplifier 76 through switch 78 which is also closed by the COI signal. This results in the vertical displacements of the waveforms A and B as shown in FIG. 1. It should be understood that more than one cylinder of interest may be depressed and the selected cylinders will be displayed, the vertical displacement between them being controlled by the output of counter 72 and the setting of variable resistance 77 in the feedback loop of amplifier 76 which serves as the vertical spread control as discussed above.

Figure 4:
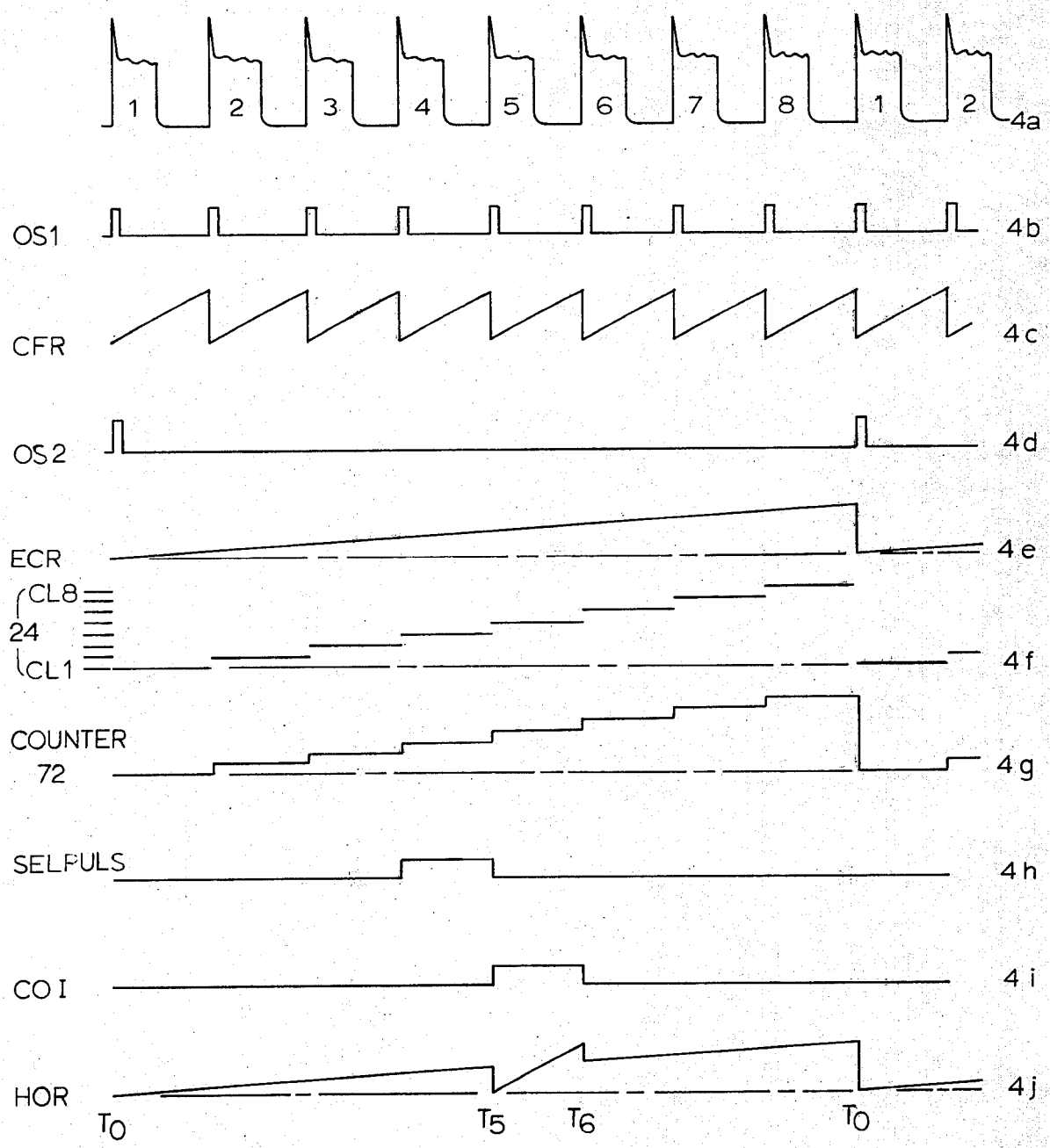
FIG. 4 is a series of graphical representations of signals developed in the circuitry of FIGS. 2 and 3.

The operation of analyzer 100 according to the instant invention will be described with reference to FIG. 4 which is a series of graphs, on the same time scale, of the signals present in the circuitry shown in FIGS. 2 and 3. FIG. 4A represents the signals at the input to pulse shaping circuit 12 developed by probe 142. These signals represent the voltage developed across the primary of the ignition coil and distributed by the engine's distributor, not shown, to the individual cylinders. For convenience the pulses representing the firing of the individual cylinders are labeled 1–8 corresponding to the cylinder markings.

Graph 4B shows OS1 generated by one shot 14 coincident with the leading edge of the firing of every cylinder. Graph 4C shows the output of CFR generator 16, the beginning of which is coincident with the leading edge of OS1. When the ramp is connected to the horizontal input of oscilloscope 104, the trace is moved across the screen once per cylinder firing as shown in FIG. 1 as trace B for cylinder 5. In the stacked mode all the cylinders would be so displayed.

Graph 4D shows OS2 generated by one shot 20 in response to the firing of cylinder No. 1 as detected by probe 148 and pulse shaping circuit 18. OS2 is therefore generated only once per cycle of cylinder firings.

Graph 4E shows the output of ECR generator 22 in response to OS2. When this ramp is applied to the horizontal input of oscilloscope 104, the trace is moved across the screen once per engine cycle so that the display on the screen would be the same as the graph of FIG. 4A for cylinders 1–8. This is the parade mode.

Graph 4F represents the output states of counter 24. As seen, CL1 is present during the firing of cylinder 1, CL2 is present during the firing of cylinder 2, etc.

Graph 4G represents the output of counter 72 showing the staircase effect, that is, the output increases one step from cylinders 1 through 8 and is then reset to start again. This results in the vertical deflection required for the stacked mode of operation.

Graph 4H represents the signal SELPULS at the output of OR gate 32 in FIG. 1 when cylinder No. 5 is selected as the cylinder of interest by actuation of pushbutton 45. It is important to note at this point that SELPULS for cylinder of interest No. 5 is effectively the CL4 output of counter 24 representing the firing of cylinder No. 4.

Graph 4I represents COI for cylinder No. 5 which occurs during the firing of cylinder No. 5.

Graph 4J represents the horizontal input to the oscilloscopic display when cylinder No. 5 is selected as the cylinder of interest. From time T0 to T5 ECR is applied to the horizontal input as it is from time T6 to T0. However, during the firing time of cylinder No. 5, selected as the cylinder of interest, CFR is applied. During this complete engine cycle the vertical input to oscilloscopic display 104 is selected by pushbuttons 120, 122, 124 or 126. To this is added the additional vertical displacement caused by signal COI as discussed previously only during the firing of cylinder No. 5. The resultant display is shown in FIG. 1 as traces A and B.

Trace A displays the firing of all cylinders except the cylinder of interest selected, i.e. except cylinder No. 5. Cylinder No. 5 is displayed in trace B in the stacked mode vertically separated from trace A.

Although a preferred embodiment of the instant invention has been described in detail, it is well within the skill of the art to make certain modifications therein without departing from the spirit or scope of the instant invention. In particular, for example, it is possible to utilize a single counter in place of counters 24 and 72. Further, it is possible to provide alternate arrangements for one shots 20 and 14 and ramp generators 22 and 16. That is, for example, the one shots could represent any part of the ramp in question rather than the beginning. In addition, when a cylinder of interest button is depressed during the parade mode, the vertical displacement during the selected cylinder could be provided from either the output of counter 72 or COI, rather than from the combination, depending upon the desired operation of the system.

We claim:

1. Apparatus for analyzing multiple cylinder internal combustion engines comprising:
an oscilloscope having a movable trace;

probe means connected to an engine for generating signals representing ignition of the individual cylinders;

vertical drive means for driving the trace in a first direction in proportion to said signals;

horizontal drive means responsive to the ignition of a preselected cylinder for driving the display in a second direction at a first rate of speed to move the trace through a range of motion in the second direction once per engine cycle;

cylinder select means for selecting a cylinder of interest; and cylinder of interest display means for modifying the horizontal drive means to drive the trace in said second direction at a second rate of speed during the ignition time of the selected cylinder of interest.

2. The apparatus of claim 1 wherein the second rate of speed moves the trace through the range of motion once per ignition of an individual cylinder.

3. The apparatus of claim 1 wherein the cylinder of interest display means includes means for modify the vertical drive means for altering the position of the trace in the first direction during the ignition of the selected cylinder of interest.

4. The apparatus of claim 1 wherein the cylinder of interest display means includes means to reposition the trace in the first direction during the firing of the selected cylinder of interest by a constant value.

5. The apparatus of claim 4 wherein the cylinder of interest display means further includes means to further reposition the display in the second direction during the firing of the selected cylinder of interest by an amount related to the particular cylinder of interest selected.

6. The apparatus of claim 1 comprising:

an ignition prevention switch associated with the probe means for preventing ignition in the engine when actuated; and means connected to the cylinder of interest display means for actuating the ignition prevention switch during the ignition time of the selected cylinder.

7. The apparatus of claim 6 comprising:

means connected to the cylinder select means for actuating the ignition prevention switch continuously to stop the engine if none of the cylinders are selected.

8. An internal combustion engine ignition analyzer comprising:

probe means connected to the ignition system of the internal combustion engine to develop signals proportional to the energy distributed to the cylinders by the ignition system;

an oscilloscope having vertical and horizontal inputs;

vertical drive means connected to the vertical input of the oscilloscope to display the signals developed by the probe means, a first ramp generator responsive to the firing of a preselected cylinder for generating a ramp of duration proportional to the engine cycle, a second ramp generator responsive to the firing of at least one cylinder to generate a ramp of duration proportional to the duration of time between the firings of individual cylinders, horizontal switch means for selecting the first or second ramp to drive the horizontal input of the oscilloscope, a cylinder select switch for identifying a cylinder of interest, and means for operating the horizontal switch means to switch between the first and second ramps during the firing of the selected cylinder of interest.

9. The analyzer of claim 8 wherein:

the probe means includes a first probe associated with the secondary circuit of the ignition system for developing a first pulse synchronized with the firing of every cylinder, and a second probe associated with the preselected cylinder for developing a second pulse synchronized with the firing of the preselected cylinder; and the horizontal switch operating means includes a counter for counting the first pulses, said counter being reset by the second pulses in order to identify the cylinder firings.

10. The analyzer of claim 9 wherein the counter includes an output line for each cylinder.

11. The analyzer of claim 10 wherein the horizontal switch operating means includes a flip-flop for connecting the first ramp to the horizontal input when set and the second ramp to the horizontal input when reset, the flip-flop being connected to an output line of the counter by the cylinder select switches.

12. The analyzer of claim 11 wherein the flip-flop is a clocked flip-flop, the first pulse is connected to the flip-flop as a clock pulse, the cylinder select switch includes a switch for each cylinder, and the set input of the flip-flop is connected by the switch for the selected cylinder to the output line of the counter for the cylinder firing just before the selected cylinder of interest.

13. The analyzer of claim 12 comprising:

an ignition prevention switch associated with the probe means for preventing ignition in the engine when actuated; and power balance test means for actuating the ignition prevention switch in response to the set output of the flip-flop.

14. The analyzer of claim 13 wherein the cylinder selector switch includes means for generating a first signal level when at least one cylinder is selected and means for applying the first signal level to the vertical driver in response to the set output of the flip-flop.

15. The analyzer of claim 14 wherein the cylinder selector switch includes means for generating a second signal level when none of the cylinders are selected and means for actuating the ignition prevention switch in response to the second signal level.

16. The analyzer of claim 15 wherein the second signal level generating means is an inverter receiving the first signal level as an input.

17. The analyzer of claim 8 wherein:

said vertical driver means includes vertical offset means responsive to said cylinder select switch for modifying the vertical drive means for altering the position of the trace in a first direction during the ignition of the selected cylinder of interest.

* * * * *